Jan. 14, 1969  DE WITT M. FESSENDEN  3,421,485
FUEL MIXING DEVICE FOR INTERNAL COMBUSTION ENGINES
Filed June 19, 1967
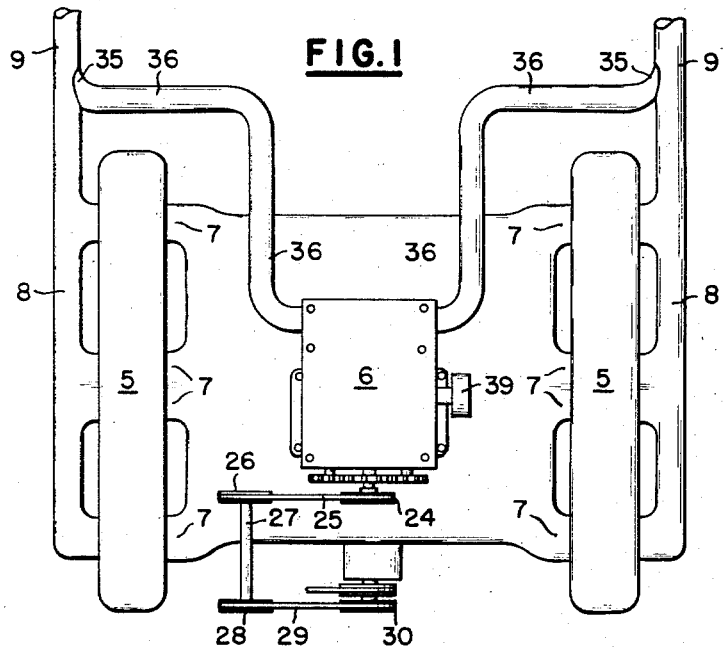
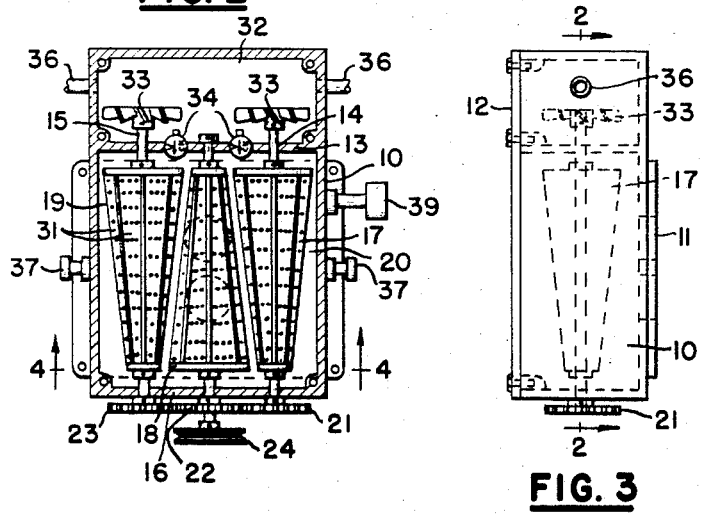
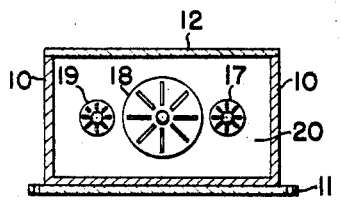
INVENTOR.
D<sup>E</sup>WITT M. FESSENDEN
BY
ATTORNEY

United States Patent Office 3,421,485
Patented Jan. 14, 1969

3,421,485
FUEL MIXING DEVICE FOR INTERNAL COMBUSTION ENGINES
De Witt M. Fessenden, 911 Summit Blvd., West Palm Beach, Fla. 33405
Filed June 19, 1967, Ser. No. 646,819
U.S. Cl. 123—119      5 Claims
Int. Cl. F02m 7/12; F02b 33/00; C10j 1/12

ABSTRACT OF THE DISCLOSURE

A fuel mixing device for internal combustion engines, the device being a housing communicating at its bottom with the intake manifolds, and having a fuel mixing chamber with conical rotary mixers therein and an exhaust receiving chamber with rotary pumps therein for forcing the exhaust gas into the mixing chamber.

---

This invention relates broadly to fuel mixing devices and more particularly to a new and novel fuel mixer for internal combustion engines.

The primary object of this invention resides in the provision of a liquid fuel mixer for internal combustion engines to crack and homogenize vaporized fuel flowing from their carburetors to their intake manifolds so as to increase the efficiency of the engines and reduce consumption of the fuel.

The invention relates basically to a fuel mixing device that is connected to the intake manifolds of two banks of cylinders in conventional V-8 engines and to homogenize the fuel to be burned in the cylinders and then exhausted to the exhaust system of the vehicle and collected from the exhaust manifold to be returned to the mixing device where it is homogenized with fuel from a carburetor or the like and then fed to the intake manifolds so as to increase the efficiency of the engines and to reduce consumption of fuel.

Another object of this invention resides in the provision of a liquid fuel mixer for internal combustion engines adapted to be operated by a rotating element of the mixing device.

A still further object of the invention resides in the provision of a liquid fuel mixer for internal combustion engines adapted to crack and homogenize vaporized fuel flowing from their carburetors to their intake manifolds and force it into the combustion chamber of the engines under predetermined pressures.

A still further object of the invention resides in the provision of liquid fuel mixer for internal combustion engines adapted to crack and homogenize vaporized fuel flowing from their carburetors to be mixed with liquid fuel in combination with exhaust gases from the exhaust manifold and to mix the exhaust gases with the fuel and direct the subsequent mixture to the intake manifolds of the cylinders, resulting in a mixture of fuel and exhaust gases to obtain a high efficiency of internal combustion engine and a minimum consumption of fuel and the invention primarily is concerned with the construction and operation of the liquid fuel mixture.

With these and other objects in view, this invention resides in certain novel features of construction and arrangement of elements to be hereinafter more particularly set forth in the specification, illustrated in the accompanying drawings and pointed out in the appended claims.

In the accompanying drawings forming a part of this application:

FIGURE 1 is a plan view of an internal combustion engine having the invention applied thereto, FIGURE 2 is a vertical section through the fuel mixer and associated parts, FIGURE 3 is a side elevational view of the fuel mixer of FIGURE 2, and FIGURE 4 is a transverse sectional view taken substantially on line 4—4 of FIGURE 2.

Referring specifically to the drawings, the numeral 5 designates banks of cylinders, common with respect to V-8 engines. The numeral 6 illustrates a fuel mixer as a whole, mounted between the banks of cylinders 5 and connected to the cylinders by intake manifolds 7. Each of the banks of cylinders 5 are connected to exhaust manifolds 8, leading to exhaust lines 9 that is subsequently connected to conventional mufflers, not shown.

The mixing device 6 is provided with side walls 10, a bottom 11 and a removable closure cover 12. The mixing device adjacent one end is provided with a partition 13, apertured at spaced apart points 14 to receive shafts 15. The shafts 15 also are rotatable in bearings upon the front wall 16 and rotatably supports homogenizing elements 17, 18 and 19. The elements 17, 18 and 19 are cone-shaped or tapered and rotate within a chamber 20 formed in mixing device 6. The elements 17, 18 and 19 are driven by a chain of meshing gears 21, 22 and 23 fixed upon the shafts and with the gear 22 being driven by a V-pulley 24 that is driven by a belt 25, from a pulley 26. The pulley 26 is fixed upon a shaft 27, having a pulley 28 at its outer end that is driven from a V-belt 29, upon the pulley 30 that is driven by the conventional water pump mounting of the engine. The elements 17, 18 and 19 are grooved from end to end and carry radially projecting perforated plates 31 that serve to homogenize the fuel before it enters the intake manifolds 7.

The partition 13 forms a chamber 32 and disposed within the chamber 32 and upon the shafts 14 and 15, are rotary pumps 33 and disposed within the partition 13, are escape valves 34 that permit the passage of gases from the chamber 32 to the chamber 20. The chamber 32 is connected to the coupling 35 of the exhaust manifold 8 and pump the exhaust gases through pipes 36, being sucked into the chamber 32 by the pumps 33 and when pressurized to a predetermined pressure in the chamber 32, escapes through the valves 34 to the chamber 20 where the exhaust gases are mixed with fuel and homogenized to be recirculated thorugh the intake manifold 7.

Upon one side wall 10 of the mixing device, there is attached a suitable fuel mixing device, similar to a carburetor and to feed fuel into the chamber 20. Also fixed to the side walls 10 and communicating with the chamber 20 are a pair of needle valves 37 for admitting oxygen to the chamber 20. The bottom 11 of the chamber 20 is provided with spaced apart aperture 38 that communicate with the intake manifolds 7.

In the use of the device, the mixing device 6 is mounted upon the upper end of the intake manifold 7 in a conventional manner and the engine is started by fuel from the carburetor 39, driving the elements 17, 18 and 19 to homogenize fuel and with the engine running, the elements 17, 18 and 19 are rotating at a relatively high speed, thoroughly mixing the fuel and air in the chamber 20, where it flows through the openings 38 in the bottom 11 and to the intake manifold 7 where it passes through the banks of cylinders where it is burned and flows from the exhaust manifolds 8 to the exhaust system of the vehicle. As the exhaust flows through the manifolds 8, a part thereof is pulled through the pipes 36 to the chamber 32 by the suction created by the pumps 33 and when sufficient pressure is exerted within the chamber 32, the gases pass to the chamber 20 through the valves 24 and are then mixed with the fuel by the homogenizers 17, 18 and 19 and with the exhaust gases as mixed with the fresh gas in the chamber 20 being reburned in the cylinders of the engine resulting in a highly efficient running of the engine and with the consumption of fuel being at a minimum. The reburning of the exhaust gases thus greatly economizes on the fuel being consumed and the exhaust gases that pass from the exhaust manifold is at a minimum, effectively reducing the smog condition of injurious hydro-carbons that are injurious to health in the atmosphere. The parts as shown and described may vary in size and shape and degree of fuel consumption and the even running of the engine.

It is to be understood that the invention is not limited to the precise construction shown, but that changes are contemplated as readily fall within the spirit of the invention as shall be determined by the scope of the subjoined claims.

I claim:
1. A fuel mixing device for internal combustion engines of the type that are provided with banks of cylinders, intake manifolds and exhaust manifolds, the mixing device being a housing that is apertured to communicate with the intake manifolds, the housing having a relatively large mixing chamber and a chamber for the reception of exhaust gases, a plurality of mixing devices of conical form that span the first named chamber and with the mixing devices being driven from the engine, conduits connected to each exhaust pipe for conducting exhaust gases to the second named chamber, rotary pumps in the second named chamber for forcing exhaust gases into the mixing chamber to be mixed with fuel to be re-circulated through the intake manifolds and reburned in the engines.

2. The structure according to claim 1 wherein the conical mixing devices are jointly driven from the water pump, the mixing devices having a multiplicity of blades that extend for the full length of the mixing devices, the shafts for the mixing devices being geared together upon the front of the mixing device, needle valves upon opposite side walls of the mixing device whereby to admit oxygen to the mixing device and a carburetor on one side wall whereby to feed fuel to the first named chamber and whereby the mixing devices will homogenize the fuel to be discharged into the intake manifolds and to be burned in the banks of cylinders.

3. The structure according to claim 1 wherein the second named chamber is connected to each exhaust manifold and collecting exhaust gases into the second named chamber, the shafts for the outermost mixing devices extending through a partition that defines the second named chamber and with air pumps upon each of the shafts, a pair of pressurized exhaust valves on the partition and whereby the air pumps create a pressure in the second named chamber to cause the exhaust gases to escape into the mixing chamber to be homogenized with the incoming gas from the carburetor and to be discharged downwardly through openings into the intake manifolds and whereby the homogenized fuel and exhaust gas will be directed to the banks of cylinders and whereby to form a fuel mixture of gasoline and exhaust gases.

4. The structure according to claim 2 wherein the mixing devices in the first named chamber are longitudinally slotted and with the slots carrying perforated plates that extend beyond the surface of the mixing devices.

5. A mixing device of the character described for use with internal combustion engines having intake manifolds and exhaust manifolds, a fuel mixing device mounted between the banks of cylinders of a V-8 engine and with the mixing device being a rectangular housing closed on its top sides and bottom, the bottom being apertured for conducting a fuel mixture through intake manifolds and with the housing being partitioned adjacent one end, to form a relatively large mixing chamber and a smaller exhaust gas receiving chamber, conical mixing devices rotatable within the mixing chamber and with the conical mixing devices having perforated blades whereby to homogenize the fuel, shafts for supporting the conical mixing devices that are journaled in an end wall and a partition, the shafts being geared together externally of the housing and with one shaft carrying a pulley that is driven from a shaft that is in turn driven by a pulley carried upon a shaft of a conventional water pump, the shafts of each of the outer mixing devices projecting into the smaller chamber and provided with air pumps, exhaust valves in the partition that open when the pumps have created a predetermined pressure, the second chamber being connected to each of the exhaust manifolds for directing a portion of the exhaust gases into the chamber, the exhaust gases escaping through the said valves to enter the mixing chamber, a carburetor connected to the mixing device for conducting a hydro carbon fuel into the mixing device and needle valves upon each side of the mixing chamber to admit oxygen to the mixing chamber and whereby the mixing devices homogenize the fuel and the exhaust gas to be discharged into the intake manifolds for consumption by th engine and to minimize fuel consumption and also avoid any smog discharge from the exhaust pipes.

References Cited

UNITED STATES PATENTS

| | | |
|---|---|---|
| 772,530 | 10/1904 | McGee. |
| 1,156,716 | 10/1915 | Shores _____ 261—88 |
| 1,529,612 | 3/1925 | Assmus _____ 261—89 |
| 2,216,722 | 10/1940 | Denson. |
| 2,669,508 | 2/1954 | Christensen _____ 123—141 X |
| 2,932,495 | 4/1960 | Olson _____ 261—89 |
| 2,969,782 | 1/1961 | Falzone. |

AL LAWRENCE SMITH, *Primary Examiner.*

U.S. Cl. X.R.

261—89